Figure 1:
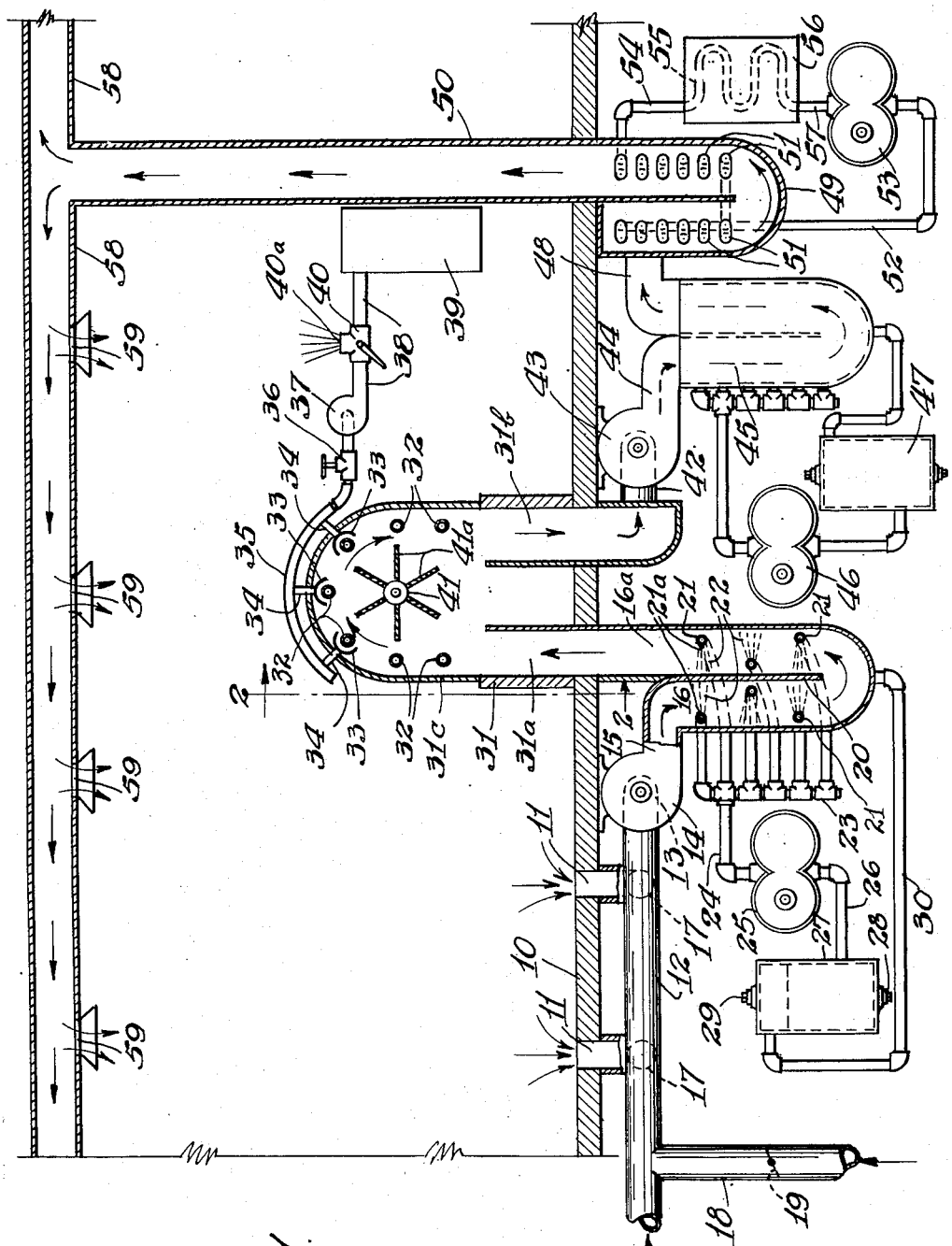

March 14, 1939. J. W. D. CHESNEY 2,150,263
SYSTEM FOR CLEANING, STERILIZING, AND CONDITIONING AIR
Filed July 2, 1937 2 Sheets-Sheet 2

INVENTOR.
JACQUES W. D. CHESNEY.
BY Albert E. Bell
ATTORNEY.

Patented Mar. 14, 1939

2,150,263

UNITED STATES PATENT OFFICE 2,150,263

SYSTEM FOR CLEANING, STERILIZING, AND CONDITIONING AIR

Jacques W. D. Chesney, Algonquin, Ill., assignor to New Discoveries, Incorporated, Chicago, Ill., a corporation of Illinois Application July 2, 1937, Serial No. 151,583

8 Claims. (Cl. 250—46)

By my invention I provide an improved system for removing dust and germ laden air and also used air, from a room, and by an improved treatment by ultra-violet rays and by other means, removing the dust and dirt from the air, admitting fresh air if desired, removing from the air the gases resulting from breathing the air, killing the bacteria in the air by ultra-violet rays and ozone, at the same time thoroughly agitating and moving the air to so treat the entire air flow, removing the excess ozone developed for other uses, further washing and cleaning the sterilized air, heating or cooling the purified air, as desired, and returning the sterilized and conditioned air to the room from which it was taken.

In circulating the air as described, I employ fans of suitable capacity to effect a complete air change in the room in a time interval determined by the size of the room relatively to the number of people in it, the air being preferably removed from or adjacent the floor, so as to include in the removed air, dust and dirt that are heavier than air, bacteria delivered to the air by persons in the room or otherwise, and carbon dioxide delivered to the air by persons in the room.

In washing the air, I employ water or water and chemicals to meet the requirements of different cases, the air being forced through successive screens of atomized liquid to thoroughly wash it.

In sterilizing the air, I deliver it, preferably after washing as described, under pressure to a compartment made to receive and treat it, and having inlet and outlet passages so spaced that the air must follow a path of travel of considerable length, in passing through the compartment. In the compartment I place tubular generators of ultraviolet rays, extending across the path of travel of the air, and so positioned relatively to the enclosing walls of the compartment, that an eddying or whirling movement is imparted to the flowing air stream, which brings all parts of the air stream into intimate association with the radiation emanated from the said generators, so that all parts of said air stream are effectively sterilized and treated by the ultra-violet rays delivered by said generators and by the ozone produced by said rays.

To produce the ultra-violet rays referred to, I preferably employ as generators thereof, cold quartz lamps or tubes, because of their many advantages over mercury vapor lamps which produce electric arcs in their quartz envelopes during operation, and which may properly be called hot quartz lamps. A cold quartz lamp or tube, is a tube of quartz filled with a mixture of argon, xenon and krypton gases and sealed after a few drops of mercury have been placed in the tube, a conductive electrode being sealed into each end of the tube to conduct into and from the tube, the electric current required to operate it. A tube so made, delivers from 92 to 96% of the electric energy supplied to it, in the form of ultra-violet radiation having a wave length of from 2536 to 2540 Angstrom units, and with the production of practically no infra-red or other heat producing rays, as a result of which, even after being in continuous use for over one hundred hours, the temperature of the tube is not over 100° F. In use, the electrodes of such a tube do not glow or become luminous, and the fact that the tube affords practically no visible evidence of its operation when operating current is passing through it, is an indication of how completely the electric energy is transformed into invisible ultra-violet radiation. In addition to the advantages referred to, such tubes are relatively inexpensive, they have extremely long life, for example 30,000 hours or more, and the rays which are principally emitted are powerful producers of ozone besides being directly and effectively germicidal to a high degree. Furthermore, such tubes may be used equally effectively, in any position.

In contrast with the above, hot quartz lamps, besides being very hot in operation due to the electric arcs within them, are hard to make and are expensive to purchase, they must be used in one certain position, they have short life, they deliver broad spectra of rays some of which are desired and many are not, and they require constant care and attention in use, whereas the cold quartz tubes require practically no attention after they are installed.

To give visible evidence of whether the cold quartz tubes of my air sterilizing and conditioning system are in operation, and whether the air is circulating properly through the system, I preferably provide a rotatable member having radial vanes, in the upper portion of the air treating compartment employed, and I make the upper portion of the walls of said compartment, of material transparent to visible radiation but not to ultra-violet rays, for example, ordinary window glass, and on the said vanes I place arbitrary designs of fluorescent material, for example, zinc sulphide, or salts of strontium or barium, which designs are illuminated by the action upon them of the ultra-violet rays, showing that the cold quartz tubes are operating, and the turning of the rotatable member by the action of the air stream on its vanes, shows that the air is circulating through the system, as well as how rapidly it is flowing.

The ultra-violet rays emitted by the cold quartz tubes, produce a large amount of ozone around said tubes, and this, together with the direct action of the ultra-violet rays, destroys the bacteria which are near said tubes. Since the air has an eddying movement in passing through the treating compartment, practically all of the moving stream of air is brought into close proximity to one or more of the cold quartz tubes, and in this manner the air is completely sterilized. In so destroying the bacteria, a corresponding amount of the ozone is consumed, but the ozone produced is so much in excess of the amount required for that purpose, that I provide means adjacent the cold quartz tubes, for drawing from the compartment a large part of the ozone produced, leaving only sufficient free ozone in the treated air to give it a healthful and tonic effect, but not enough to make said air an irritant. The removed ozone is used for any desired purpose, for example, sterilizing drinking water, or for any other purposes where sterilization or oxidization are indicated.

The sterilized and ozonized air is preferably again washed and then passed through a heating or cooling coil, according to the season of the year, and the conditioned and revitalized air is delivered back to the room for further use.

While my system is particularly adapted for use in large auditoriums, it is equally effective and desirable on a smaller scale, for example, in offices and homes, and it may readily be adapted for such purposes.

Figure 2:
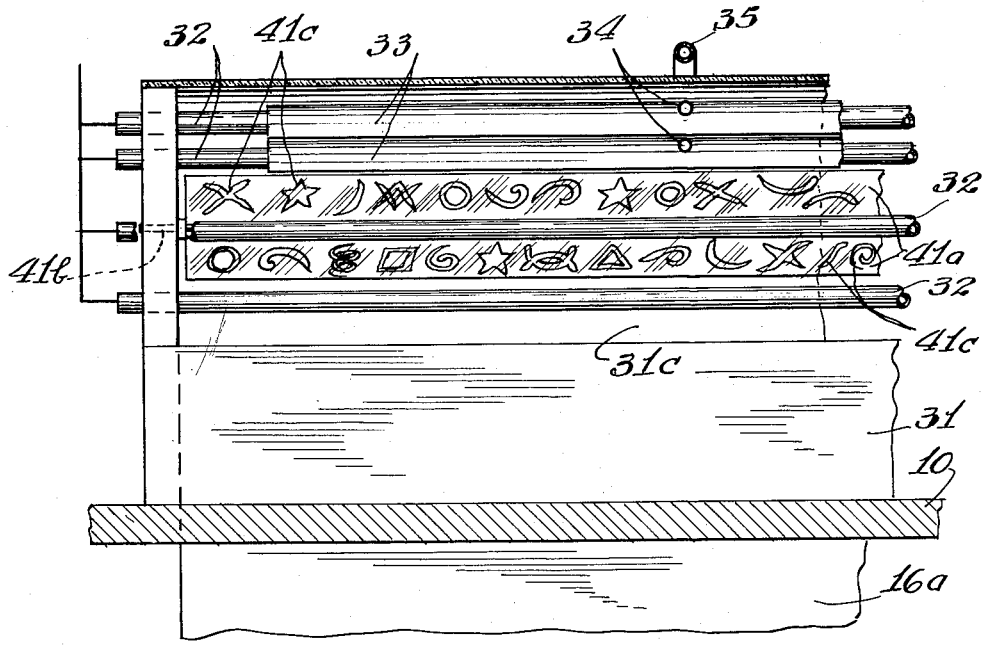

My invention will be best understood by reference to the accompanying drawings illustrating a preferred embodiment thereof, in which Fig. 1 is a vertical, sectional view of a room equipped with my system, and Fig. 2 is a front elevation of a portion of the treating compartment shown in Fig. 1.

Similar numerals refer to similar parts throughout the several views.

In Fig. 1 the floor of the room is shown in vertical section at 10, and in said floor, outlet openings 11, 11 are formed which constitute the admission openings of my system, communicating with a supply pipe 12 connected with the intake 13 of a power driven fan 14, the outlet 15 of which delivers the air under pressure into a washer 16. Each of the openings 11 is representative of a plurality of aligned openings extending transversely of the pipe 12 and communicating therewith by a pipe 17. The pipe 12 also has connected therewith, a pipe 18 extending to a source of fresh air, the flow through the pipe 18 to the pipe 12 being due to the suction of the fan 14 and controlled by a valve 19 in said pipe.

The washer 16 is provided with a longitudinal, vertical partition 20 separating the discharge passage 16a of said washer from its admission passage, said partition terminating sufficiently above the bottom of the casing of the washer, so the air may flow downwardly in the admission passage thereof, then freely around the lower edge of said partition, and then upwardly through the discharge passage thereof. Horizontal spray pipes 21 are mounted longitudinally in the admission and discharge passages of the washer, each of said pipes being provided with a series of small discharge apertures 21a, spaced closely enough together so the atomized liquid projected under pressure through said apertures, forms a sheet of spray 22 across the corresponding passage. The pipes 21 are connected with a supply header 23 which in turn is connected by a pipe 24 with the outlet of a power driven pump 25, the intake of which is connected by a pipe 26 with a supply tank 27 sufficiently above the bottom of the latter, to leave below said pipe connection, a settling compartment in said tank for dirt that settles out of the washer liquid, which settling compartment may be cleaned from time to time by removing the bottom screw plug 28. The tank 27 is closed by an upper screw plug 29 provided for cleaning and filling purposes, and the upper part of the tank is connected by a pipe 30 with the bottom of the washer 16, so that liquid and sediment collecting in the bottom of the washer will be drawn through the pipe 30 and into the tank 27 by the suction of the pump. The tank 27 is preferably filled with liquid only to a level somewhat below the connection of the pipe 30, and by properly proportioning and positioning the parts, liquid and sediment are prevented from accumulating in the bottom of the washer, without the possibility of back flow from the tank through the pipe 30 into the washer when the pump 25 is not in operation.

The pump 25 and washer 16 serve to remove the dirt and solid particles, as well as much of the odor from the used air. The liquid employed may be water alone, but I prefer to use suitable chemicals dissolved in the water, for example, lime, for by so doing I am able to remove from the used air, most of the carbon dioxide resulting from the breathing of the air.

The air delivered from the passage 16a of the washer, flows into the admission passage 31a of the treating compartment 31, in which compartment the air flows upwardly along one of its side walls, and into engagement successively with cold quartz tubes 32 of the construction described, extending horizontally and longitudinally of the compartment and nearer the side wall of the compartment than the midportion of the air stream, as a result of which the tubes 32 impart a whirling or eddying movement to the air stream, bringing practically all of the air of the stream into the zone of action of one or more of said tubes 32. After passing through the top of the compartment 31 in this manner, the air flows out from the discharge passage 31b of the compartment for further treatment.

As above stated, the tubes 32 develop and deliver large quantities of ultra-violet rays having a wave length of from 2536 to 2540 Angstrom units, to which rays the envelopes of the tubes are transparent, and in the presence of the oxygen of the air, these rays have the property of producing large quantities of ozone. Both the ultra-violet rays and the ozone are highly germicidal, with the result that practically all of the bacteria and germs in the air stream treated in the compartment 31, are destroyed, with the consumption of ozone to the extent that it is involved in such destruction. The quantity of ozone produced by the tubes 32 is, however, much greater than required for this purpose, and I find it desirable to provide some of the tubes 32 with troughs 33 connected with suction pipes 34 in turn connected with a pipe header 35 extending through a regulating valve 36 to the intake of a power driven pump 37 from the outlet of which the ozone is forced by said pump through a pipe 38 to any desired location for any desired use, represented diagrammatically by 39, for example, for sterilizing water for drinking or other purposes. In the pipe 38, I show a valve 40 having an outlet 40a to atmosphere, by which the ozone may be delivered directly to the air outside of the treatment system, to the amount and at any location desired, or, if desired, the valve 40 may be turned to close its outlet 40a and prevent the by-passing of any of the ozone from the pipe 38. In using the apparatus, the valve 36 is adjusted to leave only sufficient ozone in the compartment 31 to destroy the bacteria and germs in the air being treated, and to impart a tonic property to the air, without making the air irritating or dangerous to health. The number of tubes 32 provided with the suction troughs 33 to secure the results described, is determined by the particular conditions involved in any case.

To facilitate checking the operations taking place in the treatment chamber 31, and to visibly demonstrate to those in the room that such results are taking place, I prefer to construct the upper portion of the side walls of the compartment, of window glass having an inverted U-shaped cross-section as shown at 31c, so that the inside of the compartment is clearly visible, the curved form of the glass wall serving to turn the air stream in the upper part of the compartment and direct it to the discharge passage 31b thereof. In the upper portion of the compartment, I mount a rotary member 41 between and substantially parallel with the tubes 32, said member having longitudinal vanes 41a extending into the air stream flowing through the upper portion of the compartment. As a result, the member 41 is rotated by the air stream, the rate of rotation indicating whether the rate of flow of the air stream is proper for the conditions then existing. The member 41 is mounted for rotation on small and relatively frictionless bearings in the end walls of the compartment 31, as shown at 41b for one of said end walls in Fig. 2, in which figure the vanes 41a are shown as provided with arbitrary designs 41c, made with fluorescent material, for example, zinc sulphide, or salts of strontium or barium, which material becomes luminous and emits rays of the visible spectrum when lighted by ultra-violet rays, to which visible rays the glass wall 31c is transparent, although it is not transparent to ultra-violet rays, and in this manner it may at once be seen and demonstrated, whether the tubes 32 are operating properly, although said tubes do not themselves give off appreciable visible rays when operating.

After being treated as described in the compartment 31, the air passing from the discharge passage 31b thereof, is conducted by a pipe 42 to a second power driven fan 43 from which it is forced through a pipe 44 to a second washer 45 provided with a power driven pump 46 and liquid tank 47, which washer, pump and tank are preferably of the same construction and operate in the same manner as described above in connection with the washer 16, the liquid employed being selected according to the operating conditions in any particular case. The second washing removes the last traces of dirt and dust from the air being treated, making it not only substantially free from bacteria but also substantially free from dust, dirt and undesirable gases.

The air is delivered from the washer 45 by a pipe 48 to an air conditioning casing 49 constructed similarly to the casings of the washers 16 and 45, from which casing 49 the conditioned air is delivered into the delivery stack 50 of the system. The casing 49 contains connected coils 51 connected by a pipe 52 with a power driven pump 53, and by a pipe 54 with a coil 55 in a heat transfer receptacle 56, the other end of the coil 55 being connected by a pipe 57 with the pump 53. The receptacle 56 represents a boiler or equivalent heater for cold weather operation, when it is desired to transfer heat to the air by the coils 51, 51, and a refrigerator for hot weather operation, when it is desired to transfer heat from the air in the casing 49 to the heat transferring medium in the coils 51, 51. The heat transferring medium employed, may be water, brine, oil or any other fluid that will effectively absorb and transfer heat either to or from the coils 51, 51, but it should be pointed out that while water operates effectively as a heating medium, it is better to replace it by brine to effect cooling of the air being conditioned during hot weather operation. Heat may be supplied to the receptacle 56 for cold weather operation, and extracted from said receptacle for hot weather operation, by any well known means.

The sterilized, cleaned and conditioned air delivered to the stack 50, flows upwardly therein to a height well above occupants of the room, where horizontal distribution flues 58, 58, branch from said stack in different directions, each of said flues being provided with separated outlet openings 59, 59, for delivering the air substantially uniformly into the upper part of the room.

It will be noted that the used air is positively removed from the room, and that the treated and conditioned air is positively forced into the room, by the action of the fans 14 and 43, and that any desired rate of air circulation may be effected by driving the fans at corresponding speeds; also that, since the fans supplement each other in operation, either fan alone will circulate the air at a reduced rate relatively to the action of both fans. In connection with the treating compartment 31, however, I secure better results by using both fans, for by so doing the air to be treated is forced under pressure into said compartment and so given definite direction from the intake passage 31a towards the tubes 32 over said passage, while the sub-atmospheric pressure produced on the lower end of the delivery passage 31b, positively removes the treated air from said passage and so encourages directed flow of the whirling air stream around the tubes 32 over the said passage 31b, and so downwardly to said passage. This also prevents the development of undesirable air pressures in the compartment 31.

It will also be noted, that each unit of the system is self contained, that is to say, it does not depend upon any other unit for its operation or effectiveness; also, that the washers 16 and 45 and the conditioning casing 49 offer but small obstruction to free air flow through them. As a result, if under some conditions of operation, it is desired to stop the operation of one or both of the washers, or of the heat transferring apparatus, all that is required is to stop the corresponding one or ones of the pumps 25, 46 and 53, which produces practically no change in the rate of circulation of the air, and which as readily lends itself to any desired change in operation of any one or more of said treating and conditioning instrumentalities to meet other conditions. Briefly, each unit of the system may be run at any desired rate without interfering in any way with the operation of any other part of the system.

While the description above given, refers to treating and conditioning air taken from a room and then returning the air to the room, it will be understood that said reference is illustrative and generic, and includes any adaptation of the system. For the system described may be of any desired size, it may treat and condition air for a room of any size however large or small, or for any desired group of rooms, or, if desired, a single equipment of my system of suitable size may be employed to treat and condition air for an entire building or group of buildings, in connection with which uses, many minor changes may be made without departing from my invention.

I find it desirable in some cases to include in solution in the liquid used in the washing mechanism, a bactericidal chemical or chemicals, for example, carbolic acid, bichloride of mercury, or similar bactericidal chemicals, and I further find in such cases, that it is desirable that the said bactericidal solution shall possess a carbolic coefficient of at least 5/10 according to the Riedel-Walker method of measurement.

In carrying out my invention, therefore, I do not limit myself to the construction shown and described, as I may employ equivalents thereof without departing from the scope of the appended claims.

What I claim is:

1. In a system of the class described, the combination of an enclosed air treating compartment having air inlet and discharge passages, cold quartz tubular generators of ultra-violet rays extending longitudinally and in spaced relation through said compartment, means for forcing air to be treated through said compartment adjacent said generators, said compartment having a window in its wall transparent to visible rays, and a member mounted for rotation in said compartment, said member having vanes extending therefrom into the flowing air stream in said compartment to rotate said member, said vanes having thereon fluorescent material made visible by rays from said generators.

2. In a system of the class described, the combination of an enclosed air treating compartment having air inlet and discharge passages, cold quartz tubular generators of ultra-violet rays extending longitudinally and in spaced relation through said compartment, means for forcing air to be treated through said compartment adjacent said generators, the upper portion of said compartment having curved top and side walls of glass, and a member mounted for rotation in and extending longitudinally of said compartment, said member having longitudinal vanes extending therefrom into the air stream in said compartment to rotate said member, said vanes having thereon fluorescent material made visible by rays from said generators.

3. In a system of the class described, the combination of an enclosed air treating compartment having air inlet and discharge passages, cold quartz tubular generators of ultra-violet rays extending longitudinally and in spaced relation through said compartment, means for forcing air to be treated through said compartment adjacent said generators, said compartment having a window in its wall transparent to visible rays, and a member mounted for rotation in said compartment, said member having vanes extending therefrom into the flowing air stream in said compartment to rotate said member, said vanes having thereon fluorescent material made visible by rays from said generators, said tubular generators engaging but one side of said flowing air stream and thereby imparting a whirling movement to said air stream.

4. In a system of the class described, the combination of an enclosed air treating compartment having air inlet and discharge passages, cold quartz tubular generators of ultra-violet rays extending longitudinally and in spaced relation through said compartment, means for forcing air to be treated through said compartment adjacent said generators, the upper portion of said compartment having curved top and side walls of glass, and a member mounted for rotation in and extending longitudinally of said compartment, said member having longitudinal vanes extending therefrom into the air stream in said compartment to rotate said member, said vanes having thereon fluorescent material made visible by rays from said generators, said tubular generators engaging but one side of said flowing air stream and thereby imparting a whirling movement to said air stream.

5. In a system of the class described, the combination of an enclosed air treating compartment having air inlet and discharge passages, a generator of ultra-violet rays in said compartment, means for forcing air to be treated through said compartment adjacent said generator, said compartment having a window in its wall transparent to visible rays, and a member mounted for rotation in said compartment, said member having vanes extending therefrom into the flowing air stream in said compartment to rotate said member, said vanes having thereon fluorescent material made visible by rays from said generator.

6. In a system of the class described, the combination of an enclosed air treating compartment having air inlet and discharge passages, a generator of ultra-violet rays in said compartment, means for forcing air to be treated through said compartment adjacent said generator, the upper portion of said compartment having curved top and side walls of glass, and a member mounted for rotation in and extending longitudinally of said compartment, said member having longitudinal vanes extending therefrom into the air stream in said compartment to rotate said member, said vanes having thereon fluorescent material made visible by rays from said generator.

7. In a system of the class described, the combination of an enclosed air treating compartment having air inlet and discharge passages, a generator of ultra-violet rays in said compartment, means for forcing air to be treated through said compartment adjacent said generator, said compartment having a window in its wall transparent to visible rays, and a member mounted in said compartment for movement by the flowing air stream therein, said member having thereon fluorescent material made visible by rays from said generator.

8. In a system of the class described, the combination of an enclosed air treating compartment having air inlet and discharge passages, a generator of ultra-violet rays in said compartment, means for forcing air to be treated through said compartment adjacent said generator, the upper portion of said compartment having curved top and side walls of glass, and a member mounted in said compartment for movement by the flowing air stream therein, said member having thereon fluorescent material made visible by rays from said generator.

JACQUES W. D. CHESNEY.